Aug. 5, 1930.    R. O. PICKIN    1,772,085

PIPE CUTTING TOOL

Filed Feb. 28, 1929

INVENTOR.
Rowland O. Pickin

Patented Aug. 5, 1930

1,772,085

UNITED STATES PATENT OFFICE

ROWLAND O. PICKIN, OF LOS ANGELES, CALIFORNIA

PIPE-CUTTING TOOL

Application filed February 28, 1929. Serial No. 343,431.

The invention relates to improvements in tools used for cutting of sections of drill pipe in oil wells, and like purposes.

An object of the invention is to provide a stronger and more compact pipe cutting tool, in which the force required for forcing the cutters into contact with the pipe is contained within the tool, and is provided in the tool before the tool is inserted into the well.

Another object of the invention is to provide a pipe cutting tool, in which the cutters remain temporarily inoperative whether the tool is lowered or raised when in operating position in the well.

Another object of the invention is to provide a pipe cutting tool with a cutter restraining and releasing member which remains stationary with the pipe during the cutting operation for the purpose of preventing unnecessary wear on the friction portion of the cutter restraining and releasing member.

Another object of the invention is to provide a pipe cutting tool that is especially adapted for cutting externally flush joint pipe or casing.

Other objects and advantages of the invention will be apparent as it is better understood from the following description when considered in connection with the accompanying drawing illustrating a preferred embodiment thereof.

The figures are drawn to make the working of the tool as clear as possible, and repetition of similar parts has been avoided so as to make the number of figures as few as possible, for instance, there would normally be three or more cutters and six or more friction springs, according to the size of the tool.

Similar numerals refer to similar parts throughout the two views.

Figure 1:
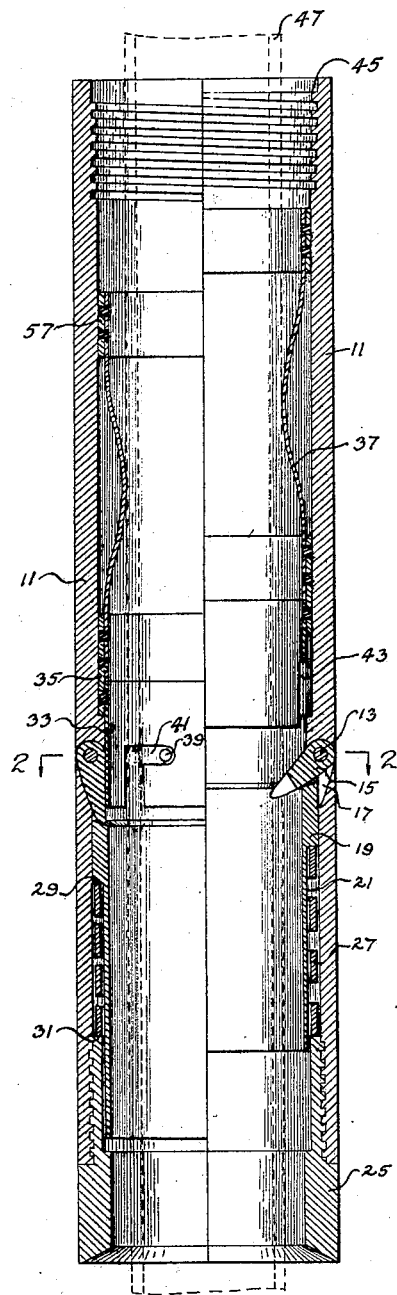
Fig. 1 is a front sectional elevation of the pipe cutting tool, the left half showing the tool with the cutters in non-cutting position, and the right half showing the tool with the cutters in cutting position.
Figure 2:
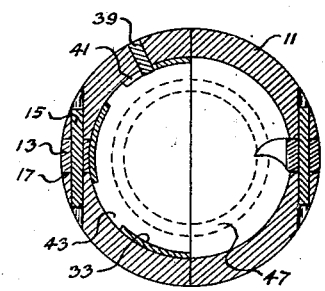
Fig. 2 is a section taken on the line 2—2 of Fig. 1.

In Figs. 1 and 2, the numeral 11 indicates the tubular body of the tool. The cutters 15 are pivotally mounted upon the pins 13 in the slots 17 provided in the body 11.

The cutters are downwardly inclined and the lower portion of the cutter is in contact with the beveled edge of the annular cutter feeding member 19, Fig. 1, positioned inside the body 11. The lower portion 21 of the cutter feeding member extends downward for the purpose of holding the cutter feeding member central in the body 11.

The bottom end of the body 11 is provided with a female thread for connecting the shoe 25, which is provided with a male thread upon its upper end.

As the shoe 25 is screwed into the body 11 the coil spring 27 is compressed between the shoulder 29 of the cutter feeding member and the shoulder 31 of the shoe, thus producing normal compression of the spring 27 at all times, which tends to force the cutter to rotate inwardly upon the pin bearing.

The annular restraining and releasing member or sleeve 33, is provided inside the body 11 for the purpose of temporarily preventing the cutters from rotating upon the pins.

The bottom end of the cutter restraining and releasing member 33 is positioned so as to overlap a portion of the cutter, and thus temporarily hold the cutter in non-cutting position. The member 33 is secured at its upper end to the ring 35.

The semi-elliptical springs 37, are also secured at their lower end to the ring 35 and at their top end to the ring 57. The elliptical springs are arranged so as to come into frictional contact with the pipe to be cut, so that upon movement of the body 11, the restraining and releasing member to which the frictional springs are attached has a tendency to remain with the pipe.

In order to control the restraining and releasing member 33, a stud 39 is provided in the body 11 and projects inwardly into the slot 41 in the restraining and releasing member 33.

An opening 43, Figs. 1 and 2, is provided in the bottom of the restraining and releasing member 33 to register with each cutter, the purpose of which will be explained later.

In operating the tool, the tool is set as shown in the left-hand half of Fig. 1. An operating member (not shown) is screwed into the connecting joint 45, the tool is then lowered into the well, and over the pipe to be cut, indicated by the dotted lines 47. When the tool reaches the position where it is desired to cut the pipe, the tool is turned to the left, the cutter restraining and releasing member 33 remains with the pipe, for the reason that the springs 37 are in frictional contact with the pipe, but the stud 39 moves with the body of the tool, and travels along the slot 41, this movement allows the cutters to pass through the openings 43, Figs. 1 and 2, forced by the pressure of the normally compressed coil spring 27 and come in contact with the pipe. The stud 39 may then be moved out of the slot 41, and below the restraining and releasing member 33 by lowering the body of the tool, the restraining and releasing member 33 remains stationary with the pipe, thus preventing wear upon the friction spring as the remainder of the tool is rotated to the right in severing the pipe, as shown at the right-hand side of Fig. 1.

The advantage of the restraining and releasing member 33, is that the tool may be run into the well and over the pipe to be cut and then if for some unforeseen reason it is desired to withdraw the tool, this may be accomplished without releasing the cutters and bringing them into contact with the pipe, as the restraining and releasing member will not release the cutters by merely moving the body of the tool up or down in the well.

In the tool illustrated, a left turn is necessary to release the cutters, the advantage of this arrangement is that the tool may be used for washing over the pipe, for which purpose it is usual to rotate to the right, and this movement will not release the cutters. In some cases it is objectionable to turn to the left, and a right-hand turn can be made to release the cutters by reversing the direction of the entrance to slot 41.

It will be seen from the foregoing that it is not necessary to raise the body of the tool to release or operate the tool for cutting pipe, and it is apparent that the tool is capable of several modifications involving this principle, as an instance, the opening in the slot 41 in the restraining and releasing member may be inclined. Also the restraining and releasing member can be reversed and arranged below the cutters, and be forced down as the cutters are released.

This invention is a modification of my copending application Serial No. 328,471 filed December 26th, 1928, in which matters common to both are claimed.

I claim:

1. In a tool for cutting pipe and for like purposes, a body, a cutter mounted therein, a cutter feeding member, a normally compressed spring for operating the cutter feeding member, said spring being normally compressed before the tool is inserted into the well, and a cutter restraining and releasing member slidably mounted between the cutters and the axis of the tool and having frictional contact with the pipe to be cut, said cutter restraining and releasing member being operated by a turning movement of said body for the purpose of allowing the said spring to force the cutter into contact with the pipe to be cut.

2. In a tool for cutting pipe and for like purposes, a tubular body, a cutter pivotally mounted therein, an annular cutter feeding member, a normally compressed spring for operating said cutter feeding member, means for compressing said spring before the tool is lowered into the well, and an annular cutter restraining and releasing member slidably mounted between the cutter and the axis of the tool and having frictional contact with the pipe to be cut, the said cutter restraining and releasing member being operated by a turning movement of said body for the purpose of allowing the said spring to force the cutter into contact with the pipe to be cut.

3. In a tool for cutting pipe and for like purposes, a tubular body, a cutter pivotally mounted therein, an annular cutter feeding member, a normally compressed coil spring for operating said cutter feeding member, means for compressing said spring before the tool is lowered into the well, and an annular cutter restraining and releasing member slidably mounted between the cutter and the axis of the tool and having frictional contact with the pipe to be cut, said cutter restraining and releasing member being operated by a turning movement of said body for the purpose of allowing the spring to force the cutter into contact with the said pipe.

4. In a tool for cutting pipe and for like purposes, a tubular body, a cutter pivotally mounted therein, and an annular cutter feeding member, a normally compressed coil spring for operating said cutter feeding member, said spring encircling the pipe to be cut and having means provided for producing normal compression of said spring before the tool is inserted into the well, an annular cutter restraining and releasing member slidably mounted between said cutters and the axis of the tool and having frictional contact with said pipe, said cutter restraining and releasing member being operated to release said cutter by a turning movement of said body.

5. In a tool for cutting pipe and for like purposes, a tubular body, cutters pivotally mounted therein with the cutting edge downwards, a cutter feeding member mounted below said cutters, and a normally compressed cutter feeding coil spring below said cutter feeding member, means for producing a normally constant pressure of said spring upon said cutters before the tool is inserted into the well, and a cutter restraining and releasing member extending around the inside of said body, between said cutters and the axis of the body, and having means provided for securing frictional contact with the member to be cut for the purpose of releasing said restraining member and allowing the cutters to come into contact with the work to be cut, and then moving said restraining and releasing member away from said cutters so that the restraining and releasing member can remain stationary with said pipe during the cutting operation.

6. In a tool for cutting pipe and for like purposes, a tubular body, cutters pivotally mounted therein, a coil spring normally compressed for the purpose of forcing said cutters into contact with the member to be cut, and a sleeve between said cutters and said member to be cut for temporarily preventing said cutters from coming into contact with the member to be cut, said sleeve being provided with means whereby the sleeve may be shifted to release the cutters while the body of the tool remains in vertically fixed position.

7. In a tool for cutting pipe and for like purposes, a tubular body, cutters pivotally mounted therein, a coil spring normally compressed for the purpose of forcing said cutters into contact with the member to be cut, and a sleeve between said cutters and said member to be cut for temporarily preventing said cutters from coming into contact with the member to be cut, said sleeve being provided with means whereby the sleeve and body of the tool may be vertically shifted one with relation to the other to release the cutters by relative rotary motion of one with reference to the other.

8. In a tool for cutting pipe and for like purposes, a tubular body, a cutter pivotally mounted therein, means for forcing said cutter into contact with the pipe to be cut, and a locking means for temporarily locking said cutter in non-cutting position, said temporary locking means consisting of a sleeve slidably positioned between said cutter and the axis of the tool and having a stud projecting from the body of the tool into an angular slot in said sleeve, said stud acting to temporarily lock said sleeve in position in said body until released by a rotary movement of said body about said sleeve.

9. In a tool for cutting pipe and for like purposes, a tubular body, a cutter mounted therein, means for forcing said cutter into contact with the pipe to be cut, and temporary locking means for locking said cutter in non-cutting position, said temporary locking means consisting of a circular member having frictional contact with the pipe to be cut and positioned between said cutter and the axis of the tool, said circular member having openings in the end thereof which upon rotating the said body in relation to the said circular member, the cutting portion of the cutter is forced to pass through the said circular member and come into contact with the pipe to be cut.

10. In a tool for cutting pipe and for like purposes, a tubular body member, a cutter pivotally mounted therein, means for forcing said cutter into contact with the pipe to be cut, and a locking member for temporarily locking said cutter in non-cutting position, said temporary locking member consisting of a sleeve slidably positioned between said cutter and the axis of the tool, and having means whereby the cutter may be released and forced into cutting position by a rotary and downward movement of said body member about said locking member.

ROWLAND O. PICKIN.